United States Patent Office 3,209,025
Patented Sept. 28, 1965

3,209,025
BIS-(β-CARBHYDRAZIDO-ETHYL)-SULFONE
Georg Lammler and Franz Patat, Frankfurt am Main, and Robert Kerber, Ludwigshafen (Rhine), Germany, and Josef Reinertshofer, deceased, late of Bad-Soden am Taunus, Germany, by Maria Babette Reinertshofer, heir, Munich, Germany, assignors to Farbwerke Hoechst Aktiengesellschaft vormals Meister Lucius & Brüning, Frankfurt am Main, Germany, a corporation of Germany
No Drawing. Filed Oct. 27, 1961, Ser. No. 148,282
Claims priority, application Germany, Oct. 29, 1960, F 32,440
1 Claim. (Cl. 260—561)

We have found that bis - (β - carbhydrazido-ethyl)-sulfone can be prepared by reacting, if desired stepwise, bis-(β-carboxy-ethyl)-sulfone or a functional derivative of this compound with hydrazine or with a hydrazine-forming compound.

The above compound is prepared by known methods. As functional derivatives of bis-(β-carboxy-ethyl)-sulfone which may be used alternatively as starting substances in the process of the present invention, there enter into consideration, in addition to the free acid, the anhydride or corresponding halides, amides and esters of the said free acid. As examples there are mentioned the chloride, the bromide, and the simple amide of the said acid. As esters there enter into consideration alkyl esters, preferably alkyl esters containing 1 to 6 carbon atoms, for example, the methyl ester, ethyl ester, propyl ester, cyclopentyl ester and cyclohexyl ester, further aralkyl esters such as the benzyl ester, and phenol esters of the bis-(β - carbophenoxy-ethyl)-sulfone type. Bis-(β-carboxy-ethyl)-sulfones which carry different functional substituents, for example, the corresponding ester-chlorides, or the esters which contain a carbhydrazide group may, of course, also be used as starting substances.

The sulfones that enter into consideration as starting substances are obtainable by known methods, for example, by oxidizing corresponding sulfides or sulfoxides, or by reacting correspondingly substituted sulfinic acids with acrylic acid or with derivatives of this acid, or by additively combining 1 mole of hydrogen sulfide with 2 moles of acrylic acid or a derivative of this compound and subsequently oxidizing the sulfide to produce the sulfone. The conversion of the carboxylic acid group into functional derivatives thereof can be effected by known methods.

The hydrazine may be used in its anhydrous form or in form of a dilution with water, preferably as monohydrate. Instead of the hydrazine, there may also be use as reactants hydrazine-forming compounds, i.e. compounds which are easily convertible into hydrazine, for example, hydrazine salts such as hydrazine sulfate and hydrazine hydrochloride, or hydrazones that are easily split by acids, for example benzal-hydrazone, or acyl-hydrazines of the formyl-hydrazine type.

In order to carry out the process of the present invention, advantageously a hydrazine is caused to act on a functional derivative of bis-(β-carboxyethyl)-sulfone in the presence or in the absence of an inert liquid. The temperature at which the reaction is carried out may be varied within wide limits. Thus, the reaction may be carried out at room temperature as well as at the temperature of the boiling water bath. Lower aliphatic alcohols such as methanol and ethanol, ether-alcohols such as glycolmonomethyl ether, cyclic ethers such as dioxane and tetrahydrofuran, dimethylformamide, dimethylsulfoxide, acetonitrile and nitrobenzene are suitable as diluents.

When a free dicarboxylic acid is used as the starting substance and this acid is reacted with hydrazine, there forms the corresponding bis-hydrazine salt which, on dehydration by heating and, if required, with the addition of dehydrating agents such as carbodiimide, is converted into the desired bis-hydrazide. When instead of the free hydrazine, salts of this compound are used, for example, the sulfate, it is advantageous to add an alkali metal salt of a weak acid, for example, the sodium acetate, in order to bind the acid. When hydrazine formers of the benzal-hydrazone or formyl-hydrazone type are used, the reaction product and the sulfone used as the starting material are subsequently hydrolysed by the action of hydrogen ions.

Purification of the bis-hydrazide can be effected by boiling it with solvents in which it is easily soluble, for example, lower alcohols such as methanol, or by recrystallizing it, for example, from glycolmonomethyl ether or dimethylformamide. However, it may also be dissolved in water and separated therefrom once again by adding a liquid which is miscible with water but does not dissolve the reaction product, for example, methanol.

The product of the present invention is very active against schistosomes; it is, therefore, very suitable for the treatment of schistosoma-infected humans and animals and is preferably used as an aqueous solution. An outstanding characteristic of the product is its extraordinarily low toxicity. Mice, for example, tolerate a single dose of 12.5 g. of the product per kg. of body weight administered subcutaneously, 11.5 g./kg. of body weight administered intravenously, or six doses of 8.0 g. per kg. of body weight administered daily subcutaneously over a period of 6 days. To other animals, for example, dogs, monkeys, and rabbits, it is not possible to administer the product in a lethal dose by one single intravenous injection.

Chronic toxicity tests revealed that rats tolerated a daily dose of 0.3 g./kg. of body weight, administered intravenously over a period of four weeks, without being injured.

In this connection it is worth mentioning that bis-hydrazides of aliphatic dicarboxylic acids or of substituted bis-(β-carbhydrazido-ethyl)-sulfones exhibit no action against schistosomes as is demonstrated in the following table.

TABLE

*Action of bis-(β-carbhydrazido-ethyl)-sulfone against infections with Schistosoma mansoni compared with that of similar compounds*

| Formula | Dos. tol. max. per kg. of body weight of mouse subcutaneous administration, mg. | Dosis curativa minima/kg. of body weight subcutaneous administration |
|---|---|---|
| $NH_2-NH-CO-CH_2-CH_2-SO_2-CH_2-CH_2-CO-NH-NH_2$ | 1×12,500<br>6× 8,000 | Mouse: 6×2,750 mg.[1]<br>Hamster (*Mesocricetus auratus*):<br>6×1,000 mg.<br>Monkey:<br>6×200 mg.<br>5×250 mg.<br>3×500 mg. |
| $NH_2-NH-CO-CH_2-SO_2-CH_2-CO-NH-NH_2$ | 5,000 | No action.[2] |
| $NH_2-NH-CO-(CH_2)_4-CO-NH-NH_2$ | 5,000 | Do. |
| $NH_2-NH-CO-\langle\textrm{C}_6\textrm{H}_4\rangle-CO-NH-NH_2$ | 5,000 | Do. |
| $NH_2-NH-CO-CH_2-CH_2-S-CH_2-CH_2CO-NH-NH_2$ | 5,000 | Do. |
| $NH_2-NH-CO-\langle\textrm{C}_6\textrm{H}_4\rangle-SO_2-\langle\textrm{C}_6\textrm{H}_4\rangle-CO-NH-NH_2$ | 5,000 | Lo. |
| $\langle\textrm{C}_6\textrm{H}_5\rangle-NH-NH-CO-CH_2-CH_2-SO_2-CH_2-CH_2-CO-NH-NH-\langle\textrm{C}_6\textrm{H}_5\rangle$ | 5,000 | Do. |
| $CH_3-CO-NH-NH-CO-CH_2-CH_2-SO_2-CH_2-CH_2-CO-NH-NH-CO-CH_3$ | 5,000 | Do. |
| $CH_3-N\langle\textrm{C}_4\textrm{H}_8\rangle N-CO-CH_2-CH_2-SO_2-CH_2-CH_2CO-N\langle\textrm{C}_4\textrm{H}_8\rangle N-CH_3 \cdot 2HCl$ | 1,250 | Do. |

[1] One administration on consecutive days.
[2] In equal dosage in tests on mice and hamsters (*Mesocricetus auratus*).

The following examples illustrate the invention but they are not intended to limit it thereto:

EXAMPLE 1

1.026 g. of bis(β-carbomethoxy-ethyl)-sulfone together with 640 cc. of hydrazine-hydrate are heated with stirring for 40 minutes on the steam bath. 1 liter of methanol is added to the hot mixture whereupon crystallization sets in. After cooling, the crystalline magma is filtered with suction and heated under reflux for 1 hour with 3.3 liters of methanol. The product is filtered off with suction while still hot and it is then well washed with methanol and dried at 70° C.

Yield: 775 g. (75% of the theoretical yield).
Melting point: 162–163° C.

EXAMPLE 2

57 g. of bis-(β-carbomethoxy-ethyl)-sulfone are suspended in 250 cc. of glycolmonomethyl ether, 170 cc. of hydrazine-hydrate are added and the mixture is allowed to stand at room temperature. After a short period there forms under spontaneous heating a solution from which the bis-hydrazide separates somewhat later. The whole is then diluted with 250 cc. of methanol, the crystalline magma is filtered off with suction and washed with methanol. The product so obtained is recrystallized from 500 cc. of glycolmonomethyl-ether.

Yield: 36.5 g.
Melting point: 162–163° C.

EXAMPLE 3

5.3 g. of bis-(β-carboethoxy-ethyl)-sulfone together with 3 cc. of hydrazine-hydrate are heated for half an hour on the steam bath. The reaction product that has separated is stirred with methanol and filtered with suction. For further purification it is dissolved in 3 cc. of water and introduced dropwise, while stirring, in 30 cc. of methanol, whereupon the product precipitates anew.

Yield: 2.6 g.
Melting point: 162–163° C.

EXAMPLE 4

10 g. of diethylsulfone-β,β'-dicarboxylic acid amide are mixed with 5 cc. of hydrazine-hydrate and the mixture is heated for 1 hour on the steam bath. After having been allowed to cool the whole is mixed with 25 cc. of water, the insoluble matter is filtered off, and the filtrate is combined with 100 cc. of methanol. The bis-hydrazide crystallizes in the form of colorless needles which are then washed with methanol and dried.

Yield: 5 g.
Melting point: 162–163° C.

EXAMPLE 5

10 g. of diethylsulfone-β,β'-dicarboxylic acid chloride are added, with stirring, to a mixture of 30 cc. of hydrazine-hydrate and 20 cc. of water, while keeping the temperature below 40° C. by cooling. Stirring is continued for 1 hour, the residue is filtered off with suction, the filtrate is combined with thrice the volume of methanol.

Yield: 7.5 g.
Melting point: 161–163° C.

EXAMPLE 6

3.6 g. of diethylsulfone-β,β'-dicarboxylic acid phenyl ester and 2.2 cc. of hydrazine-hydrate are heated for 1 hour on the steam bath. A smell of phenol can then be observed. After having been allowed to cool, the crystalline phenol is dissolved by the addition of 20 cc. of methanol, the bis-hydrazide is filtered off with suction and redissolved in a mixture of water and methanol.

Yield: 1.6 g.
Melting point: 162–163° C.

We claim:
Bis-(β-carbhydrazido-ethyl)-sulfone of the formula

$$H_2N-NH-CO-CH_2-CH_2-SO_2-CH_2-CH_2-CO-NH-NH_2$$

(References on following page)

References Cited by the Examiner

UNITED STATES PATENTS

| | | | |
|---|---|---|---|
| 2,311,098 | 2/43 | Swan | 295—9 |
| 2,700,671 | 1/55 | Häfliger | 260—310 |
| 2,780,577 | 2/57 | Phillips | 167—65 |
| 2,955,073 | 10/60 | De Beer | 167—65 |
| 2,993,932 | 7/61 | Beachem | 260—561 |
| 3,022,345 | 2/62 | Szmuszkovicz | 260—561 |

FOREIGN PATENTS 782,420  9/57  Great Britain.

OTHER REFERENCES

Holmberg: Arkiv Kemi Mineral Geol., vol. B20, No. 2, pages 1–8 (1945).

Noller: "Chemistry of Organic Compounds," Sec. Ed., p. 285 (1957).

Zimmer et al.: Jour. Org. Chem., vol. 24, pages 1140–1141 (1959).

WALTER A. MODANCE, *Primary Examiner.*

IRVIN MARCUS, *Examiner.*